United States Patent
Zhang (10) Patent No.: US 10,038,685 B2
(45) Date of Patent: Jul. 31, 2018

(54) SERVICE REQUEST AUTHENTICATION METHOD AND APPARATUS

(71) Applicant: Alibaba Group Holding Limited, Grand Cayman (KY)

(72) Inventor: Xiaochuan Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 190 days.

(21) Appl. No.: 15/009,168

(22) Filed: Jan. 28, 2016

(65) Prior Publication Data

US 2016/0219030 A1    Jul. 28, 2016

(30) Foreign Application Priority Data

Jan. 28, 2015  (CN) .......................... 2015 1 0043786

(51) Int. Cl.
*G06F 7/04* (2006.01)
*G06F 15/16* (2006.01)
(Continued)

(52) U.S. Cl.
CPC ........ *H04L 63/0807* (2013.01); *H04L 9/3234* (2013.01); *H04L 63/029* (2013.01);
(Continued)

(58) Field of Classification Search
CPC ............... H04L 63/0807; H04L 63/029; H04L 63/0815; H04L 9/3234; H04L 67/14;
(Continued)

(56) References Cited

U.S. PATENT DOCUMENTS 7,340,525 B1 *  3/2008  Bhatia ................. H04L 63/0815
                                                               709/229
7,444,407 B2 * 10/2008  Thomas ............ H04L 29/06027
                                                               709/204
(Continued)

FOREIGN PATENT DOCUMENTS

EP          2355446      8/2011
WO      WO2008002081    1/2008

OTHER PUBLICATIONS

PCT Search Report and Written Opinion dated Mar. 24, 2016 for PCT Application No. PCT/US16/15354, 8 pages.

*Primary Examiner* — Jayesh M Jhaveri
(74) *Attorney, Agent, or Firm* — Lee & Hayes, PLLC (57) ABSTRACT

Methods and apparatuses for service request authentication are disclosed to prevent a terminal or a first server that does not sign an agreement with a gateway from bypassing the gateway to directly access a second server. The method includes receiving a service request and determining a session in which the service request is located; determining whether a token corresponding to the session exists, the token corresponding to a session in which a service request from a gateway is located; if the token exists, determining that the authentication of the service request passes and proceeds to process a corresponding service; if the token does not exist, determining that the authentication of the service request fails and the processing of the corresponding service is refused. Thus, since only a session corresponding to service requests forwarded by the gateway can have a token, the authentication of each service request that belongs to such session will pass. The service request that does not belong to the session may be a service request which is directly transmitted by a merchant bypassing the gateway through the terminal or the first server which did not sign an agreement with a service interface of the second server, and the authentication fails.

18 Claims, 4 Drawing Sheets

(51) Int. Cl.
*G06F 17/30* (2006.01)
*H04L 29/06* (2006.01)
*H04L 9/32* (2006.01)
*G06F 21/41* (2013.01)
*H04L 29/08* (2006.01)
*G06F 21/00* (2013.01)

(52) U.S. Cl.
CPC .......... *H04L 63/0815* (2013.01); *G06F 21/00* (2013.01); *G06F 21/41* (2013.01); *H04L 67/14* (2013.01)

(58) Field of Classification Search
CPC . H04L 29/06; G06F 21/41; G06F 7/04; G06F 15/16; G06F 17/30
See application file for complete search history.

(56) References Cited

U.S. PATENT DOCUMENTS

| | | | |
|---|---|---|---|
| 8,925,046 | B2 | 12/2014 | Ogura et al. |
| 9,009,478 | B2 | 4/2015 | Aabye et al. |
| 9,734,321 | B2* | 8/2017 | Ahmed .................... G06F 21/41 |
| 2003/0191964 | A1* | 10/2003 | Satyavolu ........... H04L 63/0815 726/5 |
| 2006/0236093 | A1 | 10/2006 | Brok et al. |
| 2007/0192842 | A1* | 8/2007 | Beaulieu ............... H04L 9/0844 726/9 |
| 2010/0070634 | A1 | 3/2010 | Ranjan et al. |
| 2010/0299674 | A1 | 11/2010 | Wang et al. |
| 2014/0057599 | A1 | 2/2014 | Hazari |
| 2014/0289830 | A1 | 9/2014 | Lemaster et al. |
| 2014/0337954 | A1* | 11/2014 | Ahmed .................... G06F 21/41 726/8 |

\* cited by examiner

SERVICE REQUEST AUTHENTICATION METHOD AND APPARATUS

CROSS REFERENCE TO RELATED PATENT APPLICATIONS

This application claims foreign priority to Chinese Patent Application No. 201510043786.X, filed on Jan. 28, 2015, entitled "Method and Apparatus for Authenticating Service Request," which is hereby incorporated by reference in its entirety.

TECHNICAL FIELD

The present disclosure relates to the technical field of internet technologies, and in particular to methods and apparatuses for authenticating service requests.

BACKGROUND

With the continuous development of the Internet, there is an increasing number of users who select to operate on webpages to acquire a corresponding service provided by a network device (such as, a server).

In actual application scenarios, when a network device (hereinafter referred to as a first server) needs to initiate a service request to another network device (hereinafter referred to as a second server) to request the second server to complete a corresponding service processing, the first server transmits the service request to an authentication system between the two servers. The authentication system authenticates the service request. When the authentication passes, the authentication system transmits the service request to the second server. Otherwise, the authentication system refuses to transmit the service request to the second server.

In the existing technologies, usually the service request is authenticated through a gateway between two servers. For example, supposing that a user needs to operate on a webpage to buy an airplane ticket, the user transmits ticketing information to a corresponding first server on a tourism website through a terminal. The first server transmits a ticketing request to the gateway (authentication system) according to the received ticketing information. Upon receipt of the ticketing request, the gateway determines whether the first server has signed an agreement with the gateway. If yes, it is determined that the authentication of the ticketing request passes, and the ticketing request is transmitted to a second server corresponding to an aviation ticketing system. Upon receipt of the ticketing request, the second server processes the ticketing service. When the gateway determines that the first server has not signed an agreement with it, the authentication of the ticketing request fails, and the ticketing request is refused to be transmitted to the second server. However, in actual application scenarios, the first server or terminal which has not signed an agreement with the second server can bypass the gateway to directly access the second server, and upon receipt of the service request, the second server will process the service request, which thus may reduce the security of the second server.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The embodiments of the present disclosure provide methods and apparatuses for authenticating a service request to prevent a terminal or a first server which has not signed an agreement with a gateway from bypassing the gateway to directly access a second server.

The embodiments of the present disclosure provide a service request authentication method that includes receiving a service request, and determining a session in which the service request is located; and determining whether a token corresponding to the determined session exists. The token corresponds to a session in which a service request from a gateway is located.

If the token exists, the method includes determining that the authentication of the service request passes. Moreover, if the token does not exist, the method includes determining that the authentication of the service request fails.

The embodiments of the present disclosure provide a service request authentication apparatus, which includes a receiving module used for receiving a service request; a first determination module used for determining a session in which the service request is located; a judgment module used for determining whether a token corresponding to the determined session exists, wherein the token corresponds to a session in which a service request from a gateway is located; and an authentication module used for, when it is determined that the token corresponding to the determined session exists, determining that the authentication of the service request passes, and when it is determined that the token corresponding to the determined session does not exist, determining that the authentication of the service request fails.

The embodiments of the present disclosure provide methods and apparatuses for authentication of service requests. The method includes receiving a service request; determining a session in which the service request is located; and determining whether a token corresponding to the determined session exists, wherein, the token corresponds to a session in which a service request from a gateway is located. If the token exists, the method includes determining that the authentication of the service request passes and proceeding to process a corresponding service. If the token does not exist, the method includes determining that the authentication of the service request fails and refusing to process the corresponding service. Thus, since only a session corresponding to service requests forwarded by the gateway can have a token, the authentication of each service request that belongs to such session will pass. The service request that does not belong to the session may be a service request that is transmitted directly by a merchant bypassing the gateway through the terminal or a first server that has not signed an agreement with a service interface of the second server, and the authentication fails.

BRIEF DESCRIPTION OF THE DRAWINGS

To better illustrate the embodiments of the present disclosure, the following is a brief introduction of the FIGs to be used in the description of the embodiments. It is apparent that the following FIGs only relate to some embodiments of the present disclosure. A person of ordinary skill in the art can obtain other FIGs according to the FIGs in the present disclosure without creative efforts.

The drawings described herein are used for providing a deeper understanding of the present disclosure, and constitute a part of the application. The schematic embodiments of the present disclosure and the description thereof are used for illustrating the present disclosure and are not intended to limit the present disclosure. In the drawings.

The order indicated in the drawings is only for illustrative purposes. The modules can be executed in a different order or in parallel.

DETAILED DESCRIPTION

To make the objectives, technical solutions, and advantages of the present disclosure more comprehensible, the technical solutions of the present disclosure are clearly and fully described in the following with reference to the specific embodiments and corresponding accompanying drawings of the present disclosure. Apparently, the embodiments described merely represent a portion rather than all of the embodiments of the present disclosure.

All other embodiments obtained by persons of ordinary skill in the art based on the embodiments of the present application without creative efforts shall belong to the protection scope of the present application.

Figure 1:
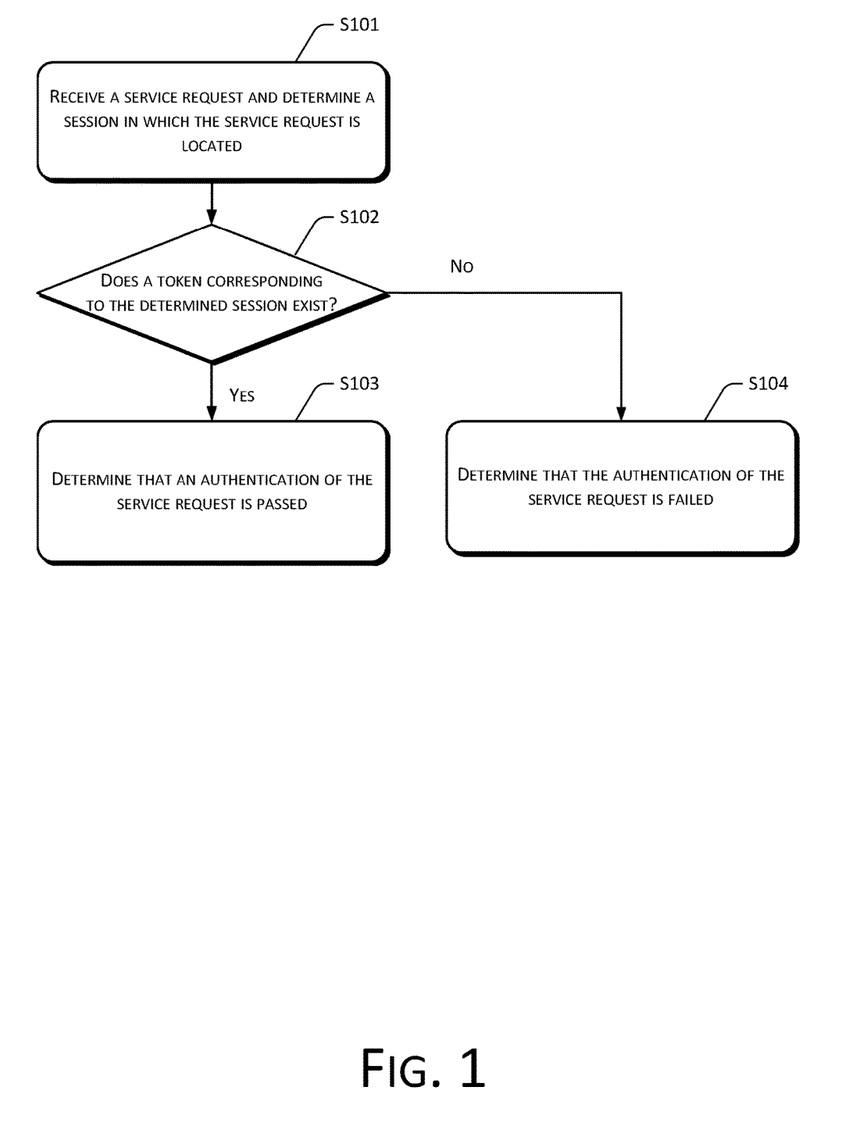
FIG. 1 is an overall flowchart of a service request authentication method according to the embodiments of the present disclosure.

FIG. 1 is a flowchart of a service request authentication method according to the embodiments of the present disclosure, including the following.

At block S101: a service request is received, and a session in which the service request is located is determined.

In the embodiments of the present disclosure, the service request received by the second server at least includes the following three types of service requests.

The first type: a service request directly forwarded by a gateway. The service request is forwarded by the first server or terminal through the gateway, and the merchant of the first server has signed an agreement with a service interface of the second server. For example, if a merchant server (the first server) needs to access a service interface of a service server (the second server) through the gateway, the merchant needs to sign an agreement with the service interface of the service server in advance, and thereby the gateway will forward the service request transmitted by the merchant server to the service server.

The second type: a service request directly from the first server or terminal. Such service request and the service request forwarded by the gateway belong to the same session, i.e., the service request is a service request associated with the service request forwarded by the gateway. The second server directly receives the service request from the terminal or the first server.

In actual application scenarios, initiators which initiate the service request of the first type and the service request of the second type are usually the same (such as the same terminal or the same first server), and the second server allows the terminal or the first server to directly transmit the service request to the second server without passing through the gateway.

The third type: a service request from the first server or the terminal directly. Such service request does not belong to the session in which the service request forwarded by the gateway is located, i.e., the service request is not associated with the service request forwarded by the gateway. In actual application scenarios, the service request may be a service request which is directly transmitted to the second server by a merchant which has not signed an agreement with the service interface of the second server, and bypasses the gateway through the terminal or the first server. For example, the merchant has not signed an agreement with the service interface of a payment server, and the gateway will not forward the service request to the payment server upon receiving the service request initiated by the merchant server (i.e., the merchant server is not allowed to access the payment server). However, the merchant server or the terminal can bypass the gateway to directly transmit the service request to the payment server to access the payment server.

Figure 2:
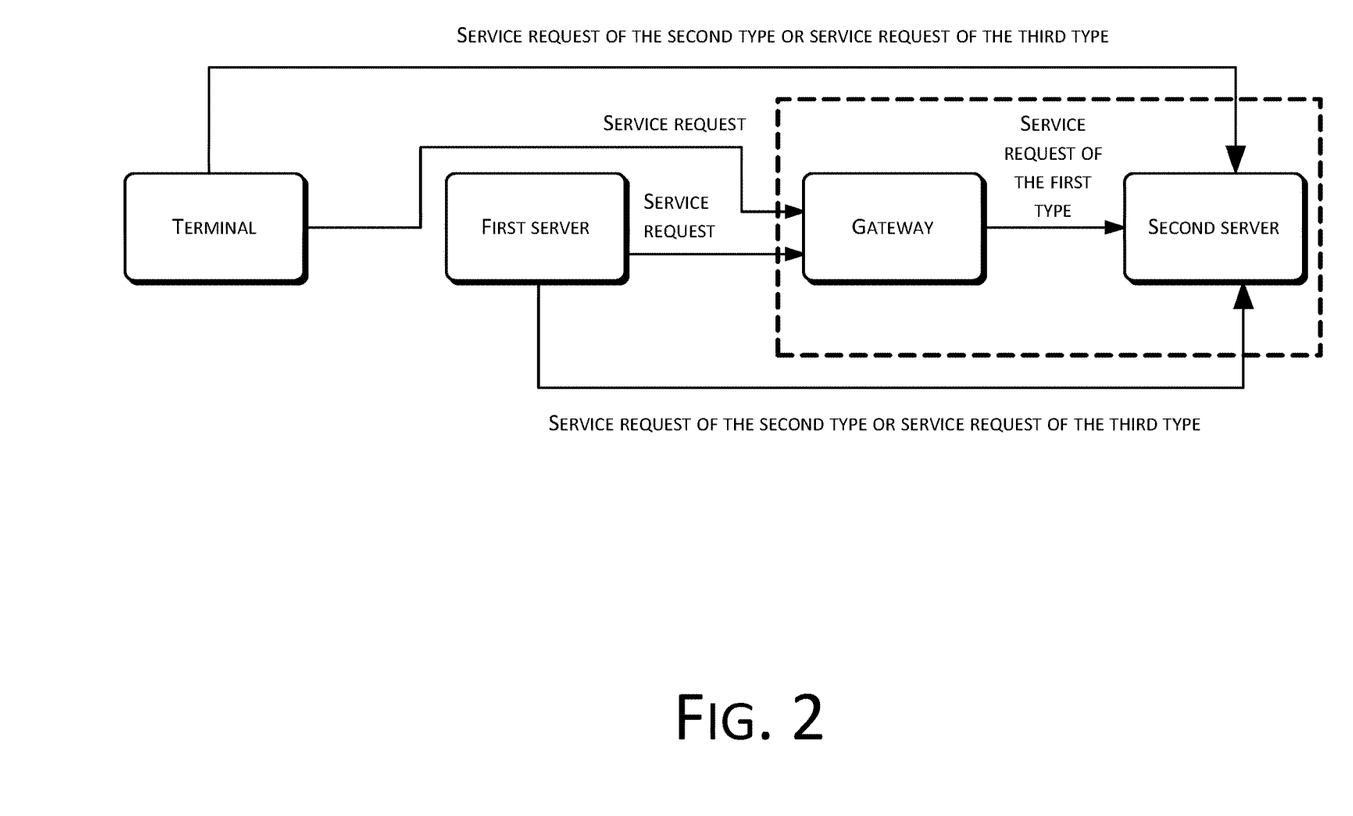
FIG. 2 is a structural schematic diagram of a service request authentication system according to the embodiments of the present disclosure.

In the embodiments of the present disclosure, the gateway and the second server are located in the same domain. As shown in FIG. 2, the gateway and the second server are located in the same domain in a dashed box.

In the embodiments of the present disclosure, upon receipt of the service request forwarded by the gateway (the service request of the first type), the second server establishes a corresponding session. Subsequently, when other service requests associated with the service request are received, each service request which is subsequently received (the service request of the second type) also belongs to the session, which does not need to be reestablished. Upon receipt of the service requests which are transmitted by the terminal or the first server and are not associated with the service request of the first type, the second server may or may not establish a session corresponding to the service request. The present disclosure will be described in case of establishing the session corresponding to the service request.

In the embodiments of the present disclosure, the service request can be a service request of a payment type, a service request of a transfer type, a service request of a recharge type, etc.

In embodiments, the service request is a service request of the payment type.

The service request of the payment type specifically may include: a payment request, a login request associated with the payment request, a modification request and the like.

For example, supposing that the merchant has signed an agreement with the service interface of the payment server, the user operates on a page provided by the merchant server through the terminal, selects to purchase a commodity S, and transmits the payment request to the gateway. The gateway forwards the received payment request to the payment server. The payment server pushes a payment page to the terminal according to the payment request. The user operates on the payment page to complete the online payment of the commodity S. Thus, the payment request received by the payment server from the gateway is the service request of the first type.

For another example, in the above example, the payment server establishes a session 1 according to the received payment request, generates a token 1 corresponding to the session 1, and pushes a payment page to the terminal. The user operates on the payment page, and directly transmits the modification request (service request) to the payment server through the terminal. The modification request which is received by the payment server and belongs to the same session (session 1) as the payment request, is the service request of the second type.

For another example, supposing that a link address of the payment request in the above example is X, if the merchant does not sign an agreement with the service interface of the payment server, and directly transmits the payment request to the payment server through the terminal, the payment request is not associated with the payment request forwarded by the gateway (i.e., the payment request for directly accessing the service interface and the payment request forwarded by the gateway do not belong to the same session), and the payment request is the service request of the third type; wherein the link address specifically can be a URL (Uniform Resource Locator).

At block S102: it is determined whether a token corresponding to the determined session exists. If a token exists, block S103 is executed. Otherwise, block S104 is executed.

In the embodiments of the present disclosure, the token corresponds to a session in which a service request from a gateway is located.

In terms of actual application scenarios, the second server determines whether the service request is from the gateway according to whether a gateway identifier exists in the link address carried by the service request. However, the second server usually cannot determine whether the merchant of the terminal or the first server which initiates the service request has signed an agreement with the service interface of the payment server. The second server processes the service request directly transmitted by the merchant that has not signed an agreement with the payment server and bypasses the gateway through the terminal or first server.

In order to prevent the second server from processing the service request directly transmitted by the merchant that has not signed an agreement with the payment server and bypasses the gateway through the terminal or first server, in the embodiments of the present disclosure, the second server does not generate a token for any service request which is not forwarded by the gateway. Correspondingly, if a session is established for such service request, the session does not have a token either. Therefore, when the second server receives the service request which is directly transmitted by the first server or the terminal, the session in which the service request is located can be determined, and whether the token corresponding to the session exists can be determined. If so, it indicates that such service request and the service request from the gateway belong to the same session; the merchant of the terminal or the first server which initiated the service request has signed an agreement with the service interface of the payment server. It can be determined that the authentication of the service request passes and proceeds to process a corresponding service. If not, it indicates that the service request is not associated with the service request forwarded by the gateway; the merchant did not sign an agreement with the service interface of the payment server. It can be determined that the authentication of the service request fails and the processing of the corresponding service is refused. Alternatively, it indicates that the service request may be associated with the service request forwarded by the gateway, but the session in which the service request forwarded by the gateway is located is not valid. The session corresponding to the currently received service request cannot be found. It can be determined that the authentication of the service request fails and the processing of the corresponding service is refused.

For example, supposing that a session 1 is established when the payment server receives a payment request 1 from the gateway, and a token 1 corresponding to the session 1 is generated. Provided that the payment server subsequently receives a modification request which is directly transmitted by a terminal A and is based on the payment request 1, it is determined that the modification request belongs to the session 1.

Supposing that a session 2 is established when the payment server receives a payment request 2 directly transmitted by a terminal B, and a token corresponding to the payment request 2 is not generated, and of course, the session 2 does not have a token either. A corresponding relationship among the transmitting terminal (such as the gateway, terminal A or terminal B), the service request, and the session and the token is shown in Table 1.

TABLE 1

| Transmitting terminal | Service request | Session | Token |
|---|---|---|---|
| Gateway | Payment request 1 | Session 1 | Token 1 |
| Terminal A | Modification request | Session 1 | Token 1 |
| Terminal B | Payment request 2 | Session 2 | |

In Table 1, the payment request 1 from the gateway corresponds to the session 1 and the token 1, and the modification request directly from the terminal A corresponds to session 1 and the token 1; the payment request 2 directly from the terminal B corresponds to session 2, and the session 2 does not have a corresponding token.

When the service request received by the payment server is payment request 1, according to Table 1, it can be determined that the session in which the payment request 1 is located is session 1. Further, it is determined that the token 1 corresponding to session 1 exists, and it can be determined that the authentication of the payment request 1 passes, and a payment page is presented.

When the service request received by the payment server is the modification request directly from the terminal A, according to Table 1, it is determined that the session in which the modification request is located is session 1. Further, it can also be determined that the token 1 corresponding to the session 1 exists. That is, it can be determined that terminal A or the merchant server which initiated the modification request has signed an agreement with the gateway. Thereby, it can be determined that the authentication of the modification request passes, and a login page is presented.

Supposing that the service request received by the payment server is the payment request 2 directly transmitted by the terminal B, according to Table 1, it is determined that the session in which the payment request 2 is located is session 2. Further, it is determined that the token corresponding to session 2 does not exist. That is, it can be determined that the merchant did not sign an agreement with the service interface of the payment server. Thus, it can be determined that the authentication of the payment request 2 fails, and a payment page is refused to be presented.

At block S103: it is determined that the authentication of the service request passes.

When it is determined that the authentication of the service request passes, the second server can process the service corresponding to the service request.

At block S104: it is determined that the authentication of the service request fails.

When it is determined that the authentication of the service request fails, the second server refuses to process the service corresponding to the service request.

According to the method shown in FIG. 1 of the present disclosure, upon receipt of the service request directly from the first server or terminal, the second server determines the session in which the service request is located, and determines whether the token corresponding to the session exists. If the token exists, it indicates that such service request is associated with the service request forwarded by the gateway; the merchant of the first server has signed an agreement with the service interface of the second server. It is determined that the authentication of the service request passes and proceeds to process a corresponding service. If the token does not exist, it indicates that such service request is not associated with the service request forwarded by the gateway; the merchant did not sign an agreement with the service interface of the second server. It is determined that the authentication of the service request has failed and the processing of the corresponding service is refused. This can effectively prevent the merchant that did not sign an agreement with the service interface of the second server from bypassing the gateway through the terminal or the first server to access the service interface of the second server.

In embodiments, when the second server receives the service request which is transmitted by the terminal or the first server and is not associated with the service request of the first type (i.e., the service request of the third type), the session may not be established.

Therefore, in the embodiments of the present disclosure, upon receipt of the service request transmitted by the terminal or the first server, the second server first determines whether the token corresponding to the service request exists. If yes, it indicates that the service request is a service request which is associated with the service request forwarded by the gateway, and the authentication of the service request passes. Otherwise, it indicates that the service request is not associated with the service request forwarded by the gateway, and may be a service request which bypassed the gateway to directly access the service interface. Thereby, the authentication fails.

In the embodiments of the present disclosure, after the second server generates the token corresponding to the session in which the service request is located, the token can be stored in a designated storage area (also referred to as a storage module). Generally, a session storage area (referred to as "Session" for short) is a storage area for storing content of a session. In the embodiments of the present disclosure, the token can be stored in a Session corresponding to the session. Because of high security of the Session, the token stored in the Session is safe as well.

Correspondingly, when the second server determines whether the token corresponding to the determined session exists, specifically, whether the token exists in the Session corresponding to the session.

In terms of actual application scenarios, the second server needs to process service requests of a particular type, including, but not limited to, account number login request, account number registration request or password change request. For the purpose of security, before the processing of the service request of such particular type, the content (such as session content and token) in the Session needs to be deleted, such that only the session content corresponding to the service request of such particular type are reserved upon subsequent processing of the service request of such particular type.

It is noted that the deletion of the session in the embodiments of the present disclosure refers to deletion of session content rather than removal of the session.

For example, supposing that session 1 is a session established based on a payment request, a login request (service request of particular type) belongs to session 1, and session 1 corresponds to a token 1, both the session content 1 and the token 1 of session 1 are stored in Session 1. Upon receipt of the login request, the payment server determines that the session content 1 corresponding to the login request is stored in Session 1, and session content 1 and token 1 in Session 1 are deleted. Then, the login request is processed. The session content generated in the processing is stored in Session 1.

In real application scenarios, other service requests such as a modification request based on session 1 may be received after the login request is processed. For example, after the payment server deletes token 1 in Session 1, the payment server may receive a modification request that is transmitted based on session 1. Since the token 1 in Session 1 has been deleted, the payment server may determine that the token corresponding to the modification request does not exist in the Session 1, and may thus incorrectly determine that the authentication of the modification request fails.

In the embodiments of the present disclosure, when the second server determines that the received service request is a service request of the particular type, and after the token generated in advance is stored in the Session corresponding to the session in which the service request is located, the token stored in the Session is copied into a link address carried by the service request of the particular type. The link address in particular embodiments can be a URL (Uniform Resource Locator).

In terms of in actual application scenarios, the token in the URL may be tampered. After the token of the session in which the service request forwarded by the gateway is located is tampered, the second server may mistake the service request which belongs to the session as a service request transmitted by the merchant that did not sign an agreement with the second server and bypassed the gateway through the terminal or the first server, and refuses to process such service request.

Therefore, in the embodiments of the present disclosure, in terms of copying the token stored in the Session into the URL carried by the service request of the particular type, in the embodiments, the token stored in the Session may be encrypted and signed. The encrypted or signed token is copied into the URL carried by the service request of the particular type.

Correspondingly, when the second server determines whether the token corresponding to the determined session exists, in particular embodiments, whether the token exists in the Session in which the session content is stored. If not, whether the token exists in the link address of the service request of the particular type can be further determined.

Optionally, when it is determined that the encrypted or signed token exists in the link address of the service request of the particular type, a decryption or a signature verification can be performed to the token. When the decryption succeeds or the signature verification passes, it indicates that the token is valid. The token is determined as a token corresponding to the session in which the service request is located. When the decryption fails or the signature verification fails, it indicates that the token is an invalid token, and it is determined that the token corresponding to the service request does not exist.

Since the Session is safer than the link address, when it is determined that the token exists in the link address of the service request of a particular type, the token in the link address further can be copied into the Session that stores the session in which the service request is located.

Following the above example, after the payment server receives a login request (service request of particular type), token 1 stored in Session 1 is copied into the URL carried by the login request. After the payment server processes the login request, and receives a modification request which belongs to session 1, the payment server determines session 1 in which the modification request is located, and determines Session 1 corresponding to session 1, then determines whether token 1 corresponding to session 1 in which the modification request is located exists in the Session 1. When it is determined that token 1 does not exist in Session 1, it is determined whether token 1 exists in the URL carried by the login request. When it is determined that token 1 exists in the URL, it can be determined that the authentication of the modification request passes. In order to improve the security of token 1 corresponding to session 1, token 1 in the URL further can be copied into Session 1.

In embodiments, when the second server determines whether the token corresponding to the determined session exists, whether the token corresponding to the session exists in the link address of the service request may be firstly determined. If not, then whether the token corresponding to the session exists in the Session is determined. That is, the sequence of determining whether the token exists in the Session and determining whether the token exists in the link address is not limited.

In terms of actual application scenarios, the service request received by the second server includes service requests which need to be authenticated, and service requests which do not need to be authenticated. For the service requests which need to be authenticated, the second server firstly authenticates the service requests, and processes a corresponding service when the authentication passes. For the service requests which do not need to be authenticated, the second server can directly perform a corresponding service processing.

For example, for a fee-based service, the merchant needs to sign an agreement with the service interface of the second server in advance. The second server needs to authenticate the corresponding service request. When the authentication passes, it indicates that the merchant corresponding to the terminal or the first server has signed an agreement with the service interface of the second server, and a corresponding processing is performed. Otherwise, it indicates that the merchant corresponding to the terminal or the first server did not sign an agreement with the service interface of the second server, and the corresponding processing is not performed. The service requests which need to be authenticated include, but not limited to: service request of a payment type, service request of a transfer type, service request of a recharge type and the like. For a free service, the second server does not need to authenticate the corresponding service requests and can directly process the service requests.

The embodiments of the present disclosure, before determining, by the second server, whether the token corresponding to the determined session exists, further include: determining whether the service request is a service request which needs to be authenticated, if so, executing the service request authentication method according to the embodiments of the present disclosure, otherwise, directly performing the service processing.

In the embodiments, the types of service requests which need to be authenticated can be preset. For example, the types of service requests which need to be authenticated can be preset to include: the service request of the payment type, the service request of the transfer type, the service request of the recharge type and the like.

Figure 3:
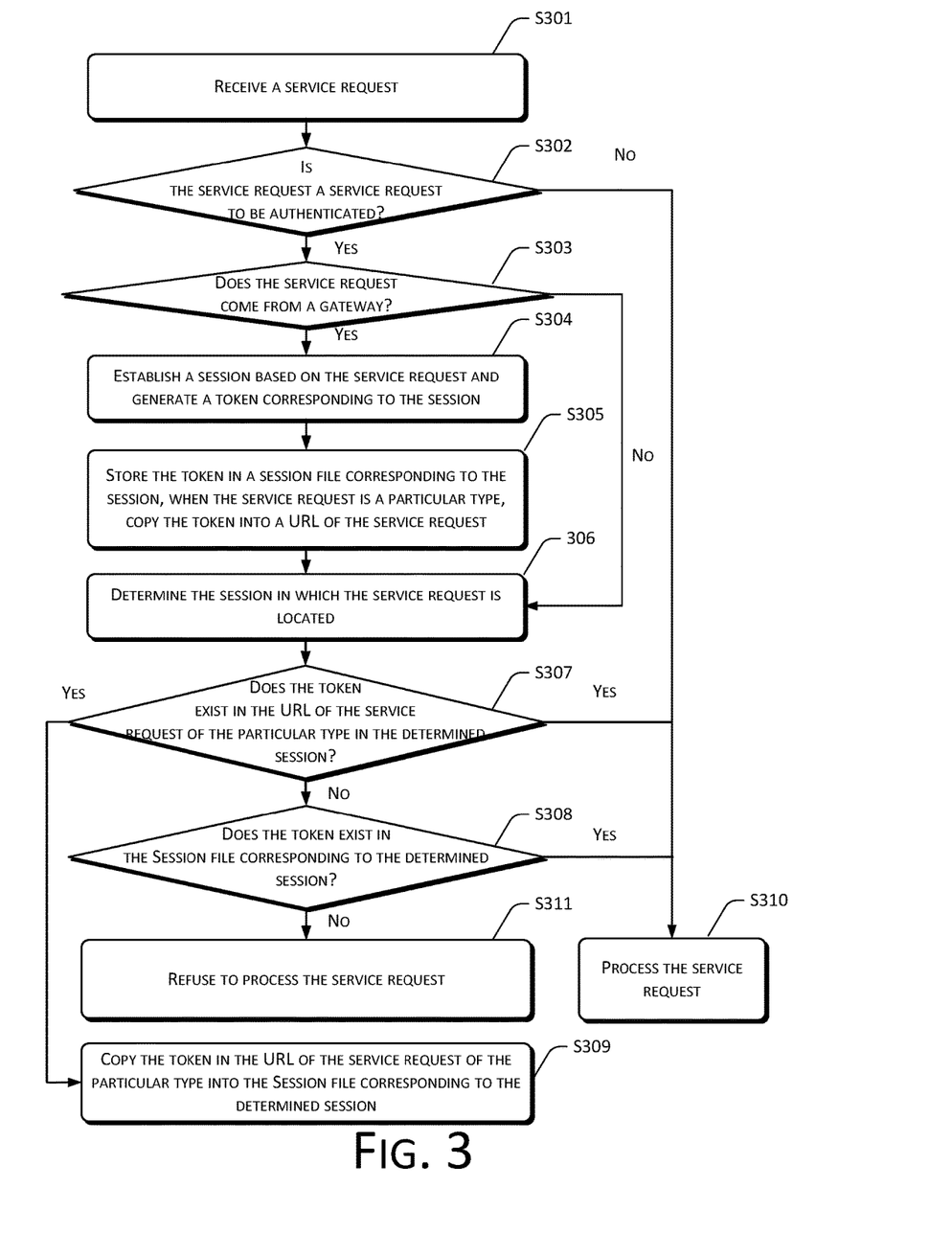
FIG. 3 is a specific flowchart of a service request authentication method according to the embodiments of the present disclosure.

The service request authentication method according to the embodiments of the present disclosure will be described in detail below, as shown in FIG. 3.

Referring to FIG. 3, the service request authentication method according to the embodiments of the present disclosure includes the steps of:

At block S301: receiving a service request.

At block S302: determining whether the service request is a service request which needs to be authenticated; if yes, executing block S303; otherwise, executing block S310.

At block S303: determining whether the service request is from a gateway; if yes, executing block S304; otherwise, executing block S306.

At block S304: establishing a session based on the service request, and generating a token corresponding to the session.

At block S305: storing the token in a Session corresponding to the session; when the received service request is a service request of a particular type, copying the token into a URL of the service request.

At block S306: determining the session in which the service request is located.

At block S307: determining whether the token exists in the URL of the service request of the particular type in the determined session; if yes, executing block S309 and block S310; otherwise, executing block S308.

At block S308: determining whether the token exists in the Session corresponding to the determined session; if yes, executing block S310; otherwise, executing block S311.

At block S309: copying the token in the URL of the service request of the particular type into the Session corresponding to the determined session.

At block S310: processing the service request.

At block S311: refusing to process the service request.

Block S307 and block S308 are interchangeable.

Figure 4:
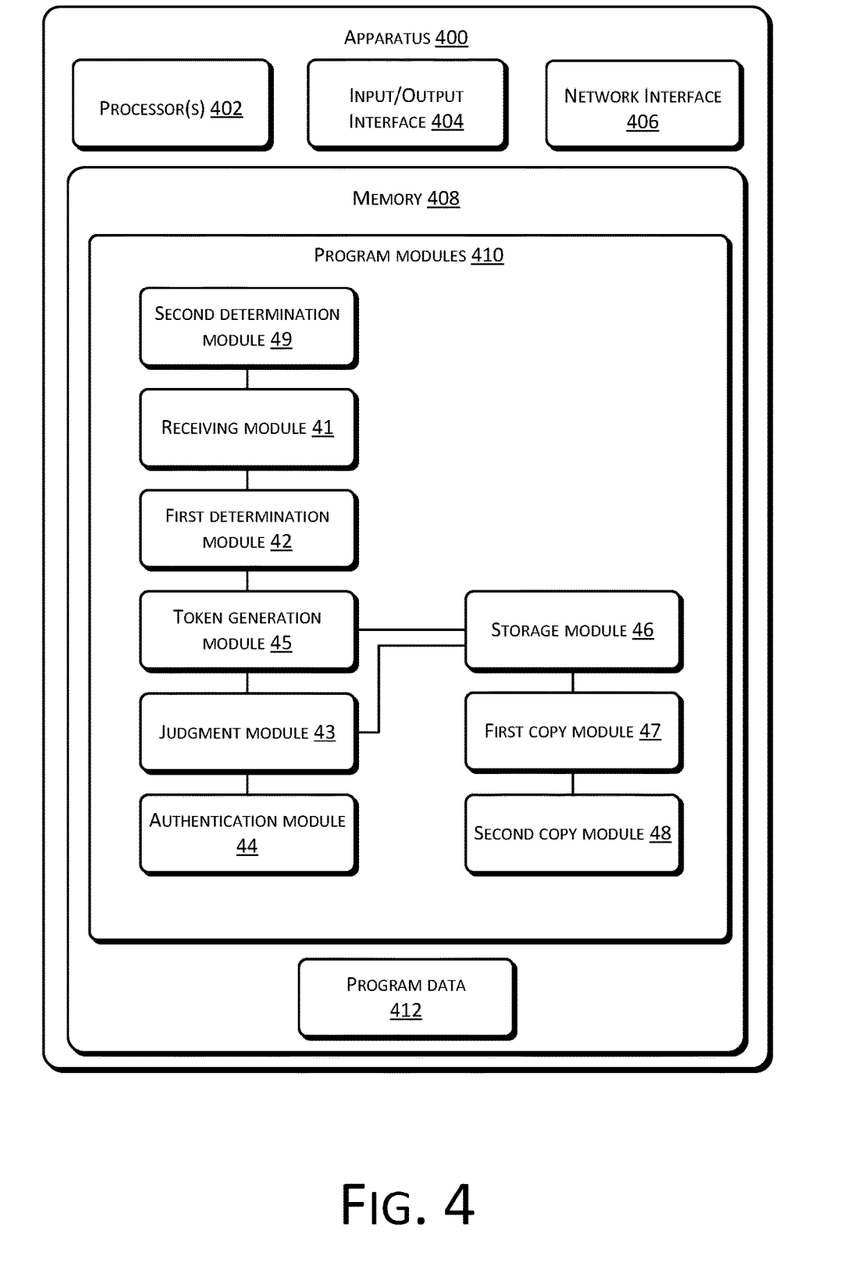
FIG. 4 is a structural schematic diagram of a service request authentication apparatus according to the embodiments of the present disclosure.

The service request authentication method according to the embodiments of the present disclosure is described above. Based on the same concept, the embodiments of the present disclosure further provides a service request authentication apparatus, as shown in FIG. 4.

In a typical configuration, a computing device may include one or more Central Processing Units (CPUs), I/O interfaces, network interfaces, and an internal memory. By way of example and not limitation, FIG. 4 shows an exemplary service request authentication apparatus 400. Referring to FIG. 4, the apparatus 400 according to the embodiments of the present disclosure may include one or more processors 402, an input/output (I/O) interface 404, a network interface 406, and memory 408.

The memory 408 may include computer readable media such as a volatile memory, a Random Access Memory (RAM), and/or non-volatile memory, e.g., Read-Only Memory (ROM) or flash RAM, and so on. The internal memory is an example of a computer readable medium. In embodiments, the memory 408 can be regarded as an example of computer readable media.

Computer readable media include permanent, nonpermanent, mobile and immobile media, which can implement information storage through any method or technologies. The information may be computer readable instructions, data structures, program modules or other data. Examples of storage media of computers include, but not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other internal memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information which can be accessed by the computation device. As defined herein, the computer readable media exclude transitory computer readable media (transitory media), such as modulated data signals and carriers.

In embodiments, the memory 408 may include a program module 410 and program data 412. For example, the program module 410 may include a receiving module 41 used for receiving a service request; a first determination module 42 used for determining a session in which the service request is located; a judgment module 43 used for determining whether a token corresponding to the determined session exists, wherein the token is corresponding to a session in which a service request from a gateway is located; and an authentication module 44 used for, when it is determined that the token corresponding to the determined session exists, determining that the authentication of the service request passes, or when it is determined that the token corresponding to the determined session does not exist, determining that the authentication of the service request fails.

Optionally, the apparatus 400 may further include a token generation module 45 used for, when the service request received by the receiving module 41 is a service request which is forwarded by the gateway, generating the token corresponding to the session in which the service request forwarded by the gateway is located.

Optionally, the apparatus 400 may further includes a storage module 46 used for, after the token corresponding to the session is generated, storing the generated token in a Session corresponding to the session.

Optionally, the apparatus 400 may further includes a first copy module 47 used for, when the received service request is a service request of a particular type, after the generated token is stored in the Session corresponding to the session, copying the token stored in the Session into a link address carried by the service request.

Optionally, the judgment module 43 may be used for, when the token corresponding to the determined session does not exist in the Session, determining whether the token corresponding to the determined session exists in the link address.

Optionally, the apparatus 400 may further include a second copy module 48 used for, when the judgment module determines that the token corresponding to the determined session exists in the link address, copying the token in the link address into the Session.

Optionally, the apparatus 400 may further include a second determination module 49 used for, before it is determined whether the token corresponding to the determined session exists, determining that the service request is a service request which needs to be authenticated.

To sum up, the present disclosure provides a service request authentication method and apparatus. The method comprises, after receiving a service request directly from a first server or the terminal, the second server determines the session in which the service request is located, and determines whether the token corresponding to the session exists.

If the token exists, it indicates that the service request and the service request forwarded by the gateway belong to a same session, and the merchant of the terminal or the first server which initiated the service request has signed an agreement with the service interface of the second server. It is then determined that the authentication of the service request passes and proceeds to process a corresponding service. If the token does not exist, it indicates that the service request and the service request forwarded by the gateway do not belong to a same session, and the merchant of the terminal or the first server which initiated the service request did not sign an agreement with the service interface of the second server. It is then determined that the authentication of the service request has failed and is refused processing of the corresponding service. This can effectively prevent the merchant which does not sign an agreement with the service interface of the second server from bypassing the gateway through the terminal or the first server to access the second server.

Persons skilled in the art should understand that, the embodiments of the present disclosure may be provided as a method, an apparatus or device, or a computer program product. Therefore, the present disclosure may be implemented as a hardware embodiment, a software embodiment, or an embodiment combining both software and hardware. Moreover, the present disclosure may be a computer program product implemented on one or more computer usable storage media (including, but not limited to, a magnetic disk memory, a CD-ROM, an optical memory, and the like) including computer usable program codes.

The present disclosure is described with reference to flowchart illustrations and/or block diagrams of methods, apparatus or device (system) and computer program products according to embodiments of the disclosure. It will be understood that each flowchart and/or block diagram, and combinations of flowchart and/or block diagram in the flowchart illustrations and/or block diagrams can be implemented by computer program instructions. These computer program instructions may be provided to a processor of a general purpose computer, special purpose computer, embedded processor or other programmable data processing device to produce a machine, such that the instructions, which execute via the processor of the computer or other programmable data processing device, create means for implementing the functions specified in one or more flowcharts in the flowchart and/or one or more blocks in the block diagram.

These computer program instructions may also be stored in a computer-readable memory that can direct a computer or other programmable data processing device to function in a particular manner, such that the instructions stored in the computer-readable memory produce an article of manufacture including instruction means which implement the function specified in one or more flowcharts in the flowchart and/or one or more blocks in the block diagram.

The computer program instructions may also be loaded onto a computer or other programmable data processing device to cause a series of operational steps to be performed on the computer or other programmable devices to produce a computer implemented process such that the instructions which execute on the computer or other programmable devices provide steps for implementing the functions specified in one or more flowcharts in the flowchart and/or one or more blocks in the block diagram.

It should also be noted that, the term "include" and variants thereof are intended to cover non-exclusive inclusion, so that an expression of "including a process, a method, an article or a device of a series of elements" not only includes these elements, but also includes other elements not explicitly listed, or further includes inherent elements of the process, the method, the article or the device. Under the condition of without further limitation, an element as defined by a statement "including a . . . " is not exclusive of additional identical elements in the process, the method, the article or the device of the element.

Persons skilled in the art should understand that, the embodiments of the present disclosure may be provided as a method, a system, or a computer program product. Therefore, the present disclosure may be implemented as a completely hardware embodiment, a completely software embodiment, or an embodiment combing software and hardware. Moreover, the present disclosure may be a computer program product implemented on one or more computer usable storage media (including, but not limited to, a magnetic disk memory, a CD-ROM, an optical memory, and the like) including computer usable program codes.

The above descriptions are merely embodiments of the present disclosure, and are not intended to limit the present disclosure. For persons skilled in the art, the present disclosure may have various modifications and variations. Any modification, equivalent replacement, improvement or the like made with the spirit and principle of the present disclosure should be included in the scope of claims of the present disclosure.

What is claimed is:

1. A service request authentication method, the method comprising:
   receiving a service request;
   determining whether the service request comes from a gateway;
   upon determining that the service request comes from the gateway,
      establishing a session based on the service request,
      generating a token corresponding to the session in which the service request is located,
      storing the generated token in a session storage area corresponding to the session,
      determining the session in which the service request is located,
      determining whether the token corresponding to the determined session exists, the token corresponding to the session in which the service request is located, and
      determining whether an authentication of the service request is passed; and
   upon determining that the service request does not come from the gateway,
      determining a session in which the service request is located,
      determining whether a token corresponding to the determined session exists, the token corresponding to the session in which the service request is located, and
      determining whether an authentication of the service request is passed.

2. The method of claim 1, further comprising:
   determining that the token corresponding to the determined session exists; and
   determining that the authentication of the service request is passed.

3. The method of claim 1, further comprising:
   determining that the token corresponding to the determined session does not exist; and
   determining that the authentication of the service request fails.

4. The method of claim 1, further comprising copying the token stored in the session storage area into a link address carried by the service request after the generated token is stored in the session storage area corresponding to the session.

5. The method of claim 4, wherein determining whether the token corresponding to the determined session exists includes determining whether the token corresponding to the determined session exists in the link address when the token corresponding to the determined session does not exist in the session.

6. The method of claim 5, further comprising copying the token in the link address into the session in response to determining that the token corresponding to the determined session exists in the link address.

7. The method of claim 1, further comprising determining that the service request comprises a service request to be authenticated prior to determining whether the token corresponding to the determined session exists.

8. A service request authentication apparatus, comprising:
   one or more processors; and
   memory coupled to the one or more processors, the memory storing a plurality of executable modules by the one or more processors, the plurality of executable modules comprising:
      a receiving module configured to receive a service request;
      a judgment module configured to determine whether the service request comes from a gateway;
      a token generation module configured to generate a token corresponding to a session in which the service request is located upon determining, by the judgment module, that the service request comes from the gateway;
      a first determination module configured to determine the session in which the service request is located;
      the judgment module further configured to determine whether the token corresponding to the determined session exists, the token corresponding to the session in which the service request is located;
      an authentication module configured to determine whether an authentication of the service request is passed; and
      upon determining that the service request does not come from the gateway, one or more of the plurality of executable modules configured to:
         determine a session in which the service request is located,
         determine whether a token corresponding to the determined session exists, the token corresponding to the session in which the service request is located, and
         determine whether an authentication of the service request is passed.

9. The service request authentication apparatus of claim 8, wherein the authentication module is further configured to determine that the authentication of the service request is passed in response to determining that the token corresponding to the determined session exists.

10. The service request authentication apparatus of claim 8, wherein the authentication module is further configured to determine that the authentication of the service request fails in response to determining that the token corresponding to the determined session does not exist.

11. The apparatus of claim 8, wherein the plurality of executable modules further comprises a storage module configured to store the generated token in a session storage area corresponding to the session after the token corresponding to the session is generated.

12. The apparatus of claim 11, wherein the plurality of executable modules further comprises a first copy module configured to copy the token stored in the session storage area into a link address carried by the service request when the received service request comprises a service request of a particular type.

13. The apparatus of claim 12, wherein the judgment module is further configured to determine whether the token corresponding to the determined session exists in the link address when the token corresponding to the determined session does not exist in the session storage area.

14. The apparatus of claim 13, wherein the plurality of executable modules further comprises a second copy module configured to copy the token in the link address into the session in response to the judgment module determining that the token corresponding to the determined session exists in the link address.

15. One or more computer-readable media storing executable instructions that, when executed by one or more processors, cause the one or more processors to perform acts comprising:
   receiving a service request;
   determining whether the service request comes from a gateway;
   upon determining that the service request comes from the gateway,
      establishing a session based on the service request,
      generating a token corresponding to the session in which the service request is located,
      storing the generated token in a session storage area corresponding to the session,
      determining the session in which the service request is located,
      determining whether the token corresponding to the determined session exists, the token corresponding to the session in which the service request is located, and
      determining whether an authentication of the service request is passed; and
   upon determining that the service request does not come from the gateway,
      determining a session in which the service request is located,
      determining whether a token corresponding to the determined session exists, the token corresponding to the session in which the service request is located, and
      determining whether an authentication of the service request is passed.

16. The one or more computer-readable media of claim 15, the acts further comprising:
   determining that the authentication of the service request is passed in response to determining that the token corresponding to the determined session exists; or
   determining that the authentication of the service request fails in response to determining that the token corresponding to the determined session does not exist.

17. The one or more computer-readable media of claim 15, the acts further comprising:
   copying the token stored in the session storage area into a link address carried by the service request after the generated token is stored in the session storage area corresponding to the session.

18. The one or more computer-readable media of claim 17, wherein determining whether the token corresponding to the determined session exists includes determining whether the token corresponding to the determined session exists in the link address when the token corresponding to the determined session does not exist in the session.

* * * * *